(No Model.)

D. J. HURLEY.
TAPPING DEVICE.

No. 466,946. Patented Jan. 12, 1892.

WITNESSES
H. M. Sturgeon
A. L. Jackson

INVENTOR
Daniel J. Hurley
By A. Sturgeon
Atty.

UNITED STATES PATENT OFFICE.

DANIEL J. HURLEY, OF ERIE, PENNSYLVANIA.

TAPPING DEVICE.

SPECIFICATION forming part of Letters Patent No. 466,946, dated January 12, 1892.

Application filed April 28, 1891. Serial No. 390,881. (No model.)

*To all whom it may concern:*

Be it known that I, DANIEL J. HURLEY, a citizen of the United States, residing at Erie, in the county of Erie and State of Pennsylvania, have invented certain new and useful Improvements in Tapping Devices; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in tapping devices hereinafter set forth and explained, and illustrated in the accompanying drawings, in which—

Figure 2:
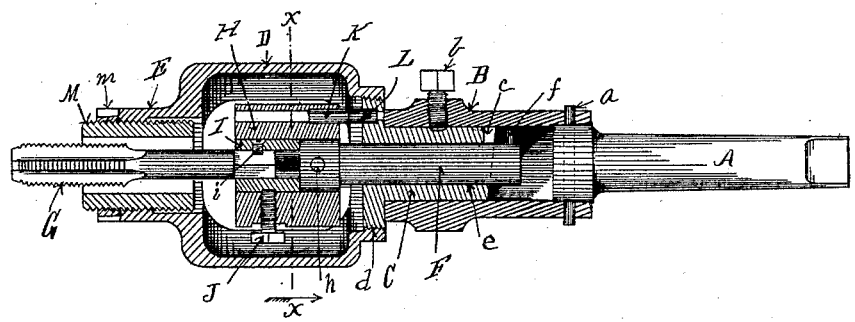
Figure 1:
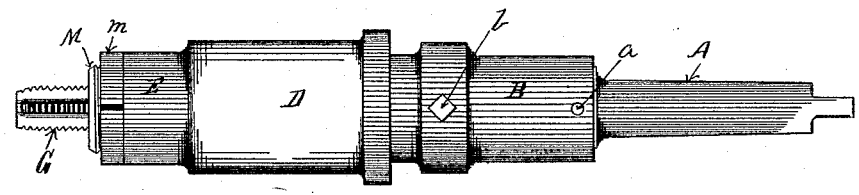
Figure 3:
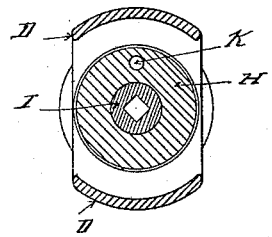
Figure 4:
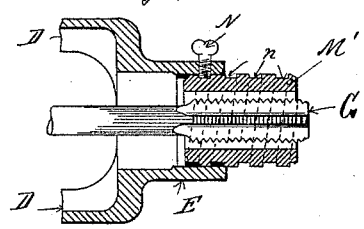

Figure 1 is a side elevation of my improved tapping device. Fig. 2 is a longitudinal section of same. Fig. 3 is a transverse section of same on the line $x\,x$ in Fig. 2, looking in the direction of the arrow. Fig. 4 is a sectional view of an alternative construction of a portion of my improved tapping device.

Like letters refer to like parts in all the figures.

In the construction of my improved tapping device shown in the drawings, A is a collet or spindle adapted to be inserted in the socket of chuck or of a drill-press or lathe-spindle. To the lower end of the collet or spindle A, I secure a sleeve B, preferably by means of a transverse pin $a$. In the lower portion of the sleeve B, I secure the stem or spindle C of the yoke D, preferably by means of the set-screw $b$, the stem C and yoke D being preferably secured together at $d$, the yoke D terminating at the lower end of the hollow sleeve E, as and for the purpose hereinafter set forth.

Longitudinally through the stem or spindle C of the yoke D, I bore an opening $e$, adapted to receive a tap-chuck spindle F, through the upper end of which I place a transverse pin $f$, adapted to engage with the shoulder $c$ on the upper end of the stem or spindle C when the portion A B D of the tapping device is raised and the motion thereof reversed for unscrewing the tap G.

Upon the lower end of the spindle F, I secure a tap-chuck H, (preferably by means of a transverse pin $h$,) adapted to receive a tap-bush I, secured therein by means of a set-screw J.

In one side of the tap-chuck H, I secure an upwardly-projecting pin K, and in the upper part of the yoke D or in the stem or spindle C thereof I secure a downwardly-projecting pin L at a point radially the same distance from the center of the spindle F as the upwardly-projecting pin K, so that when the stem F and the tap-chuck H thereon are raised up, as shown in Fig. 2, the pin L engages with the pin K in the tap-chuck and rotates the tap-chuck and tap G therein in the direction the collet or spindle A, sleeve B, and yoke D are being rotated until the spindle F moves downward in the opening $e$ of the spindle C a sufficient distance to disengage the pins L and K from each other, when the motion of the spindle F, tap-chuck H, and tap G ceases. This result is produced by the lower end of the sleeve E contacting with the work being tapped when the tap G has entered the work a sufficient distance, which stops the downward movement of the collet or spindle A, sleeve B, and yoke D, leaving the tap G to continue its downward movement until the pins K and L become disengaged from each other, when the downward movement of the tap G also ceases. When it is desired to remove the tap G from the work, the motion of the drill-press spindle is reversed, which reverses the rotation of the collet or spindle A, stem B, and yoke D. Then by raising them upward the pin $f$ in the spindle F engages the shoulder $c$ on the upper end of the stem C and operates to reverse the motion of the tap G and unscrew it from the work.

For conveniently gaging the depth to which it is desired to have the tap G operate, I preferably provide the sleeve E on the lower end of the yoke D with an extension-sleeve M, operating telescopically up and down in the sleeve E, preferably by being screw-threaded therein and provided with a lock-nut $m$, so that the length of the sleeve E may thereby be extended and adjusted, so as to contact with the surface of the work being tapped and stop the operation of the tap, as hereinbefore described, at any desired point.

In Fig. 4 I have illustrated an alternative construction of the extensible portion of the sleeve E on the yoke D, the sleeve E in this case being provided with a set-screw N, the end of which enters an inclined groove *n* in the surface of a sleeve M', so that the sleeve M' is adjusted and held in place by said set-screw N.

Having thus fully described my invention so as to enable others to construct and use the same, what I claim as new, and desire to secure by Letters Patent of the United States, is—

1. The combination, in a tapping device, of an outside collet or spindle and yoke secured together and adapted to be placed in a socket or chuck and driven by a rotating spindle, with a tap-chuck mounted on an inner spindle adapted to move longitudinally up and down within said outside yoke and spindle, pins in said yoke and tap-chuck adapted to engage for rotating said tap-chuck, a tap secured therein in one direction, and a pin in the upper end of said tap-chuck spindle adapted to engage with a shoulder in the outside spindle and yoke for rotating said tap-chuck and tap secured therein in the other direction, substantially as and for the purpose set forth.

2. The combination, in a tapping device, of an outside collet or spindle and yoke, and an adjustable sleeve on the lower end of the yoke, with a spindle mounted within said outside spindle and adapted to move up and down therein, a tap-chuck mounted in the lower end of said inner spindle, and a pin or lug on said tap-chuck adapted to engage with a pin or lug in the yoke or spindle for screwing the tap into the work until the sleeve on the lower end of the yoke contacts with the work so as to move the inner spindle downward in its bearings on the outer spindle and disengage said pins from contact with each other, substantially as and for the purpose set forth.

3. The combination, in a tapping device, of a collet or spindle A, sleeve B, and yoke D, secured together and adapted to be placed in a socket or chuck on a rotating spindle, and an adjustable collar or sleeve E M on the lower end of said yoke D, with a tap-chuck H within said yoke mounted on a spindle F, operating in the center of the sleeve B, a pin L, projecting downwardly from the top of the yoke D, a pin K, projecting upwardly from the top of the tap-chuck, and a pin *f* in the upper end of the spindle F, adapted to engage with a shoulder *c* on the stem C of the yoke D, substantially as and for the purpose set forth.

In testimony whereof I affix my signature in presence of two witnesses.

DANIEL J. HURLEY.

Witnesses:
FRED. W. GROVES,
H. H. LOCKE.